United States Patent [19]

Sheridan et al.

[11] 3,938,220

[45] Feb. 17, 1976

[54] ZONE REGULATION OF CASING INFLATION GAS

[75] Inventors: Arthur L. Sheridan, Woodridge; Walter V. Marbach, Palos Heights, both of Ill.

[73] Assignee: Union Carbide Corporation, New York, N.Y.

[22] Filed: May 8, 1974

[21] Appl. No.: 468,105

[52] U.S. Cl. ......................................... 17/42; 17/49
[51] Int. Cl.² ............................................ A22C 11/02
[58] Field of Search ............... 17/42, 49, 33, 34, 35; 426/390, 465; 138/118.1, 119

[56] References Cited
UNITED STATES PATENTS

| | | | |
|---|---|---|---|
| 3,231,932 | 2/1966 | Michl | 17/49 |
| 3,264,680 | 8/1966 | Reigler | 17/49 |
| 3,507,669 | 4/1970 | Dhuysser et al. | 17/42 |
| 3,688,343 | 9/1972 | Ziolko | 17/42 |
| 3,745,610 | 7/1973 | Urbutis | 17/42 |

Primary Examiner—Louis G. Mancene
Assistant Examiner—James D. Hamilton
Attorney, Agent, or Firm—Maurice W. Ryan

[57] ABSTRACT

Inflation gas pressure interior of a flexible tubing, such as a food casing, advancing continuously through multiple processing zones, is controlled variably from zone to zone by coacting metering rolls and gas pumping nip rolls arranged on the tubing travel locus.

10 Claims, 7 Drawing Figures

ZONE REGULATION OF CASING INFLATION GAS

This invention relates to the production of sausage casings and more particularly to an improved method and apparatus for processing a just-fabricated continuous length of extruded tubing, either edible or inedible, which is to be used as a casing in sausage product manufacturing.

The production of sausage products such as frankfurters and the like has historically involved the use of animal intestines as sausage casing material. Edible natural casings obtained from animal intestines have many obvious disadvantages in the present day high speed, highly automated sausage manufacturing techniques, the more salient disadvantages being that they vary in size, in physical integrity, and in facile comestibility, and are rather difficult to clean and prepare by mechanical means for human consumption.

A significant departure from the use of natural animal intestine casing occurred in the sausage making industry with the development of so-called skinless frankfurters which involve the use of synthetic casing materials. The synthetic casing materials used to make skinless frankfurters are inedible and are therefore slit and peeled from the finished sausage product and discarded before product final packaging. Typically, cellulose frankfurter casings for use in skinless frankfurter production are manufactured in continuous tubular lengths starting with an extrusion step. The continuously extruded tubing length is inflated, directed through a series of chemical and physical treatments, is dried, flattened, and rolled up on reels for transport to a shirring station. At the shirring station, the tubing is dereeled, reinflated, shirred, and compressed on a shirring machine to obtain relatively rigid tubular elements known in the industry and supplied to sausage makers as shirred casing sticks.

In the sausage manufacturing process, the sticks are successively manually or automatically fitted, one at a time, over a stuffing horn which feeds or stuffs meat emulsion into the casing. As the casing fills with the meat emulsion, it deshirrs and extends longitudinally to the original casing length. During the stuffing step, pre-selected lengths of filled casing may be tied off, twisted, or otherwise circumferentially diminished to form sausage links. The continuous stuffed lengths in link form are then further processed by cooking, smoking, curing and the like steps, depending on the requirements of the product being made. The casing is removed and discarded prior to final packaging of the sausage product.

Certain sausage products, however, are still the more advantageously made with a casing which is not discarded and which is edible. Highly satisfactory edible sausage casings produced from protein sources such as reconstituted animal collagen have been developed. A suitable thin-walled casing is obtained by extruding a collagen mass into the form of a continuous tubing which is then passed through one or more chemical treatment baths, drying steps, and similar treatments. The thus prepared collagen tubing casing is dried, shirred into casing sticks, severed into pre-selected lengths, packaged, and delivered to the sausage makers in much the same way as the cellulose casing sticks. The collagen casings are tender, readily cookable, and edible with the sausage stuffing emulsion material. The shirred casing or stick, comprising as it may a length of up to 50 meters or more of 0.0254 millimeter wall thickness material, such as cellulose, with a tubular diameter most usually in the order of 26 millimeters shirred and compressed to a length of about 50 centimeters, is, it will be readily appreciated, a relatively fragile structure. Since the feeding of sticks on to the horn of the stuffing machine is most frequently an automatic operation involving the positioning of each stick in turn on the stuffing horn from a supply hopper, any structural irregularity in the stick can cause a malfunction with consequent shutdown and loss of production time on the stuffing machine.

One of the most critical factors in making the sticks is the precision of the shirring operation. Careful and precise shirring steps are therefore of critical moment in the manufacture of the non-edible casing sticks, but are of even greater criticality in the manufacture of the more fragile edible collagen sticks.

In order to accomplish proper and effective shirring and to permit the shirring elements of the shirring machine to grip the advancing tubing and form pleats therein, the tubing is inflated to a condition where the tubing wall attains a suitable degree of rigidity and stiffness. Inflating a tubing from a hollow shirring mandrel is well known in the art of making cellulose casing. The equivalent process at this step of production of collagen tubing is, however, a much more delicate operation. Due to the fact that the freshly made collagen tubing is fragile, weak, and porous, and is not readily collapsible to a flat condition without the peril of damage, the extrusion, chemical treatment, sizing, drying, and shirring operations are customarily and advantageously performed in one continuous process. The tubing inflation gas, air for example, may, as in the case of cellulose tubing manufacture, be supplied to the tubing from a hollow shirring mandrel used in the process, but the pressure of the inflation air must be maintained very low. Thus, the production of edible collagen sausage casings presents the problem of the need for a relatively low pressure inflation gas throughout most of the production steps while, at the same time, the requirement of a relatively higher inflation gas pressure for the shirring operation which is involved in the final production steps. At the time of shirring the collagen casing it is dry, has a much higher degree of mechanical strength and physical integrity than it had in the course of its progress as a fragile, weak, wet, and porous tubing through the process steps preceding shirring, and a relatively higher casing inflation pressure may therefore be safely used.

Here it should be noted, that while the method and apparatus of the present invention was initially developed for use in collagen casing production, it is within the consideration of the inventors that this invention is equally and as advantageously applicable to other types of tubing, cellulose for instance, where, for one reason or another, it is necessary to use relatively low pressure inflation in one or another of the production phases and a relatively high inflation pressure in another phase.

A wet extruded collagen tubing is usually inflated to a low gas pressure of up to about 1 to 2 inches water column. While this pressure is satisfactory for the sizing and the drying steps, it is inadequate for shirring. Tubing shirred at such a low pressure, particularly collagen tubing, cannot be made to attain that degree of wall rigidity and stiffness necessary to effect properly firm contact with the shirring elements and the resulting sticks produced are limp, non-uniform, and non-coherent, a highly unsatisfactory product.

In the production of collagen tubing, the inflation pressure for the tubing in the drying zone is usually no greater than about 1 inch water column, while the inflation pressure for the tubing in the shirring zone may be as high as up to about 135 inches water column. The pressure differential may be within the range of from about 135:1 to about 20:1 with a preferred range of from about 80:1 to about 40:1. The inflation pressure, however, depends on the speed of the continuously advancing tubing. For example, at a tubing speed of 15 feet per minute, if the tubing inflation pressure in the drying zone is, for example, about 1 inch water column, the pressure in the shirring zone may be 80 inches water column, i.e., a pressure differential of 80:1. If the casing speed is doubled to 30 feet per minute, the inflation pressure will preferably be about 2 inches water column in the drying zone, while it may remain at 80 inches water column in the zone of shirring, a pressure differential of 40:1.

The problem may thus be succinctly stated as a need to selectably control and regulate casing inflation gas pressures to obtain discrete requisite pressures in different zones of the casing production process. In order to simplify the discussion, the description will refer mainly to collagen tubing.

With this then being the state of the art, the present invention was conceived and developed to provide a selectably controllable inflation gas system which will maintain a desired pressure differential between two adjacent zones in flexible tubing as the tubing moves continuously unidirectionally from one of the zones to the other.

The invention more specifically provides a system for inter-zone regulation of flexible food casing inflation gas pressure requiring only a single inflation gas source and feed point.

A further feature and advantage of the invention is its provision of a tubing production zone pressure regulating system which is adaptable to maintain an inflation gas pressure differential between two adjacent zones irrespective of which of the zones includes the gas supply input.

Another and important feature of the invention is that it permits the continuous high speed production techniques hitherto practically workable only in conventional cellulose casing production to be readily adapted to the continuous in-line production of the more fragile and difficult to handle casings, particularly collagen casings.

Still another important and more specific attribute of the invention is that it obviates the inflation pressure problems attending collagen casing production by providing for low inflation pressures throughout most of the production steps and high inflation for the shirring operation.

These and other features and advantages of the invention will be the more readily understood and appreciated from the ensuing more detailed description and from the drawings, wherein:

FIG. 1 is a schematic drawing of part of a food casing production machinery system, showing apparatus according to the present invention installed between a low pressure drying zone and a high pressure shirring zone, FIG. 2 is a schematic drawing of part of a food casing production machinery system showing apparatus according to the present invention installed between a low pressure wet treatment zone and a relatively higher pressure drying zone;

In general, the present invention comprehends, in a system for the production of flexible film tubing which system includes means for continuously introducing an inflation gas into the interior of the tubing and means for continuously unidirectionally advancing the tubing from a first zone to a second zone, apparatus to maintain a preselected inflation gas pressure differential between the first zone and the second zone comprising, in combination:

A pair of nip rolls disposed in selectably adjustable tube flattening nipping contact on the continuously advancing tubing, at least one of the rolls of said pair having a circumferential surface provided with alternate lands and grooves extending transversely on the width of its circumferential surface, and means to continuously selectably vary the contact pressure exerted on the advancing tubing by said pair of nip rolls, whereby a continuous succession of selectably variable volume inflation gas accumulation chambers is formed, one chamber at a time, in the advancing tubing in said grooves and the successive inflation gas quantities in said accumulation chambers are passed from one of said zones to the other.

More specifically, a typical apparatus combination according to the invention comprises a pair of nip rolls consisting of a first roll and second roll disposed in tube flattening nipping contact on the continuously advancing tubing, said first roll having a smooth transversely flat resilient circumferential surface, said second roll having a circumferential surface provided with alternate lands and grooves extending transversely across the width of its circumferential surface, means to continuously selectably vary the contact pressure exerted on the advancing tubing by said pair of nip rolls, and rotational drive means operably connected to one of said rolls, whereby a continuous succession of selectably variable volume inflation gas accumulation chambers is formed, one chamber at a time, in the advancing tubing in the grooves of the second roll coacting in nipping relationship with the first roll, and the successive inflation gas quantities in said accumulation chambers are passed from one of said zones to the other.

Figure 1:
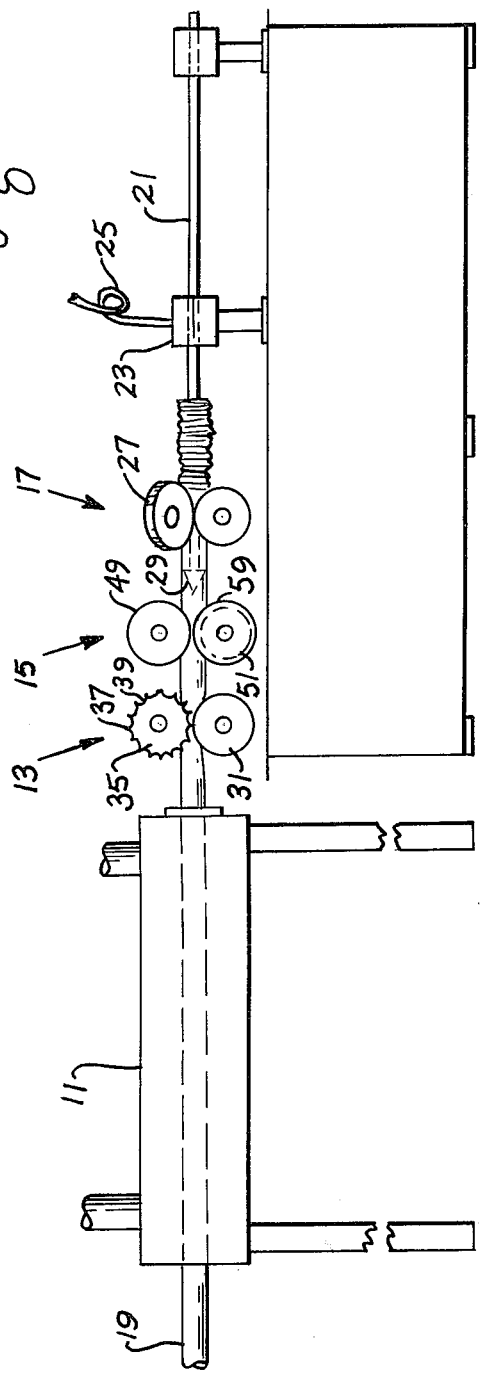

FIG. 1 shows a portion of a collagen casing production apparatus comprising a dryer 11, a pressure regulating station 13, a metering roll assembly 15, and a shirring station 17. A casing 19, in process, advances from left to right in FIG. 1, leaving the dryer 11 at a low inflation gas pressure, passing through the pressure regulating station 13 into a zone of high inflation gas pressure, and then passing through the metering roll assembly 15 to the shirring station 17, where a shirring head 27 of conventional construction shirrs the casing 19 on a shirring mandrel 21 into the pleated or shirred condition shown immediately to the right of the shirring station in drawing FIG. 1. Inflation gas, usually air, at a high pressure required for the shirring operation, is supplied to the shirring mandrel 21 by means of periodically applied C clamp type inflator blocks 23 connected to an air supply source 25. Between sequential introductions of inflation air into the mandrel 21, the inflator blocks 23 retract clear of the mandrel 21 surface to permit the shirred casing 19 to pass on along the mandrel for severing, compacting, and removal as discrete sticks.

The primary function of the metering roll assembly 15 is to feed the casing at controllable speed into the shirring head 27. The metering rolls thus effect relatively high firm nip pressures and tend to completely tightly flatten the advancing casing. Since this complete nipping action would otherwise effectively prevent the inflation air eminating from the tip 29 of the shirring mandrel 21, one of the metering rolls is provided with a continuous circumferential recess or groove 59 which permits expansion thereinto of the flattened nipped casing forming a passage to accommodate air flow through the metering roll assembly 15. The metering roll assembly may also be advantageously adapted to shift selectably to a non-grooved mode of nip operation wherein the casing is sealed off completely against air flow. This enables seal-off of the low inflation pressure zone to allow for start-ups, repairs to the shirring apparatus, and other maintenance procedures.

Figure 3:
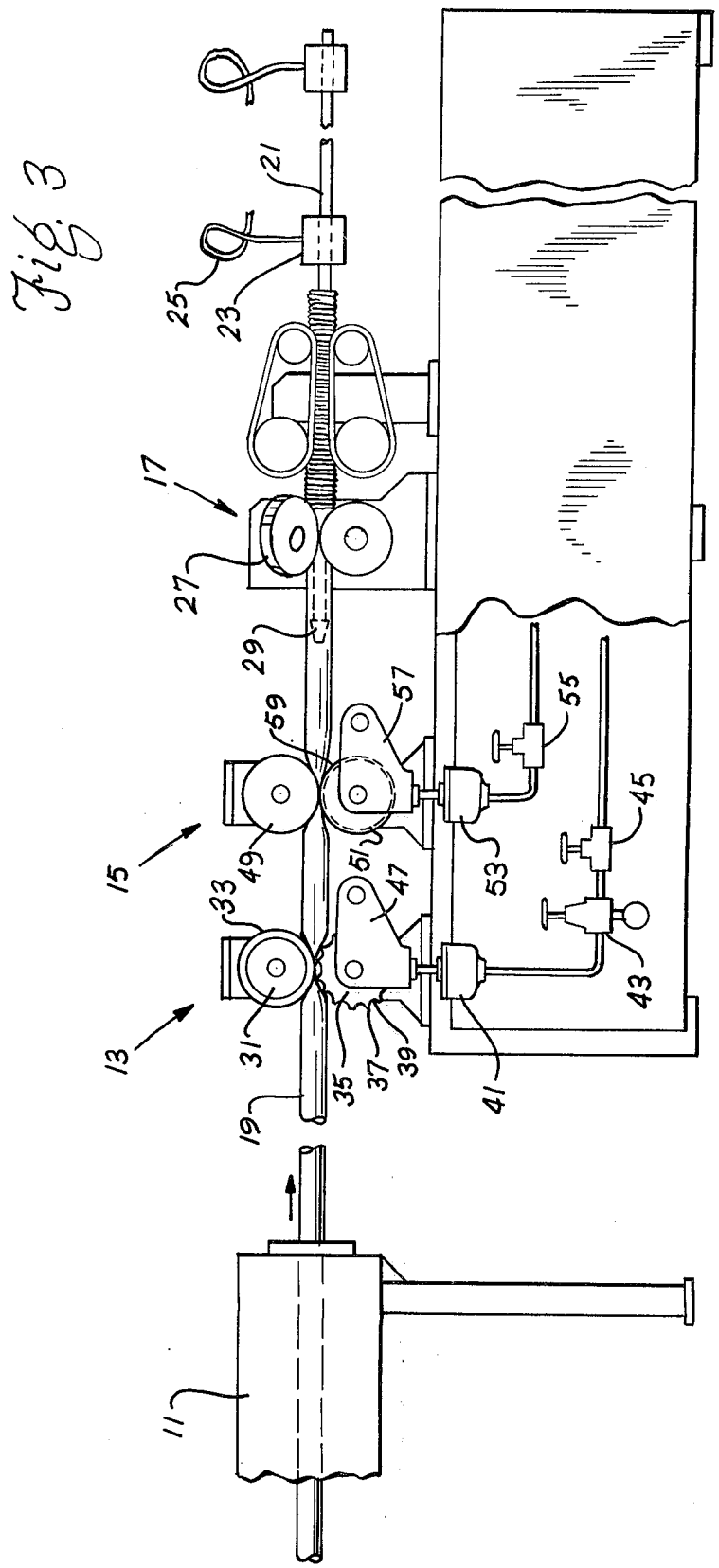
FIG. 3 is a side elevation of an apparatus arrangement similar to that shown schematically in FIG. 1, showing details of apparatus according to the invention.

In FIG. 3 of the drawings, the pressure regulating station 13 nip roll pair consists of a first roll 31 having a smooth transversely flat circumferential surface 33 and a second roll 35 having a circumferential surface provided with alternate lands 37 and grooves 39 extending transversely across the width of the circumferential surface of said second roll. The first roll 31 is a drive roll and is driven rotatably counterclockwise as shown by any suitable variable speed power source. The second roll 35 is an idler roll which is urged into coacting pressurized nip relationship on the casing 19 against the first roll 31 by controllable pneumatic pressure means 41, 43, 45 and a conventional mechanical linkage 47. With further reference to FIG. 3, the metering roll assembly 15 consists of a smooth surfaced drive roll 49 and an idler roll 51 urged into coacting pressurized nip relationship on the casing 19 against the drive roll 49 by controllable pneumatic pressure means 53, 55 and a conventional mechanical linkage 57. A circumferential groove 59 is provided on the peripheral circumferential surface of the idler roll 51 to define an air passage in the nipped casing and thus permit equalization of the shirring zone inflation pressure across the metering roll assembly 15.

Inflation air supplied to the mandrel 21 is fed continuously into the casing at mandrel tip 29 and inflates the casing up to the desired shirring pressure in a zone bounded on one end by the shirring head 27 and on the other by the pressure regulating station 13. To what extent the inflation pressure in the zone to the left of pressure regulating station 13 is maintained lower than the inflation pressure in the shirring zone is determined, for any preselected linear rate of speed of casing advance, by the nip pressure obtaining between the pressure regulating station first and second rolls 31, 35.

Figure 4:
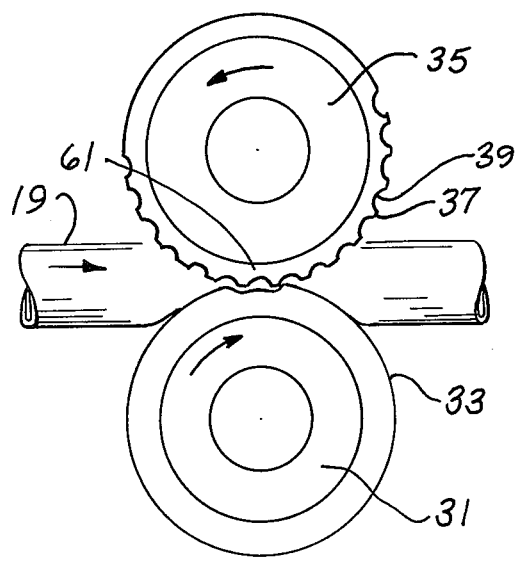
FIG. 4 is a detailed view of apparatus according to the invention illustrating a high nip pressure operating condition.
Figure 5:
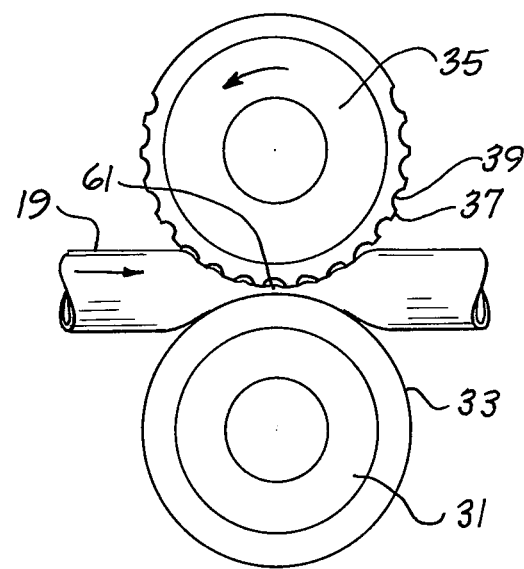
FIG. 5 shows the apparatus of FIG. 4 in a low nip pressure operating condition.

FIGS. 4 and 5 of the drawings illustrate the operating mode of apparatus according to the invention. In FIG. 4, a casing 19 in process is shown passing from a zone of low inflation pressure at the left of the drawing, through coacting pressure regulating nip rolls 31, 35 to a zone of high inflation pressure at the right of the drawing. The nip pressure for the condition shown is high and the engagement of the lands 37 of roll 35 against the casing 19 and the surface 33 of roll 31 is such that the casing is pinched closed or nipped across its flattened width at each line of contact between a land 37 and the surface 33. This forms an entrapment or gas accumulation chamber 61 in the casing between these contact lines, bounded top and bottom respectively by the wall of a groove 39 and the surface 33 of roll 31. Each discrete volume of inflation gas so trapped is at the pressure obtaining in the low pressure zone to the left of the drawing. As the pressure regulating rolls rotate, roll 35 counterclockwise and roll 31 clockwise, these discrete volumes or quantities of gas in each sequentially formed accumulation chamber 61 are forceably passed or pumped into the zone of high inflation pressure to the right of the drawing. For any maintained nip pressure between the rolls, the pumping rate and the gas pressure differential attained between the zones is directly proportional to the speed of advance of the casing 19.

FIG. 5 illustrates the effect of operating the apparatus at a low nip pressure with very light or no engagement of the lands 37 of roll 35 against the casing and surface 33 of roll 31. With any condition of less than full nip, the accumulation chamber 61 between the lands will be less than tightly fully closed and the inflation gas will tend to bleed down from the high pressure zone into the low pressure zone in counterflow to the pumping action tending to move accumulated volumes or quantities of air in the opposite direction. In the low nip pressure mode as in the high nip pressure mode, the pressure differential attained between the zones for any maintained nip pressure is directly proportional to the speed of casing advance.

Figure 6:
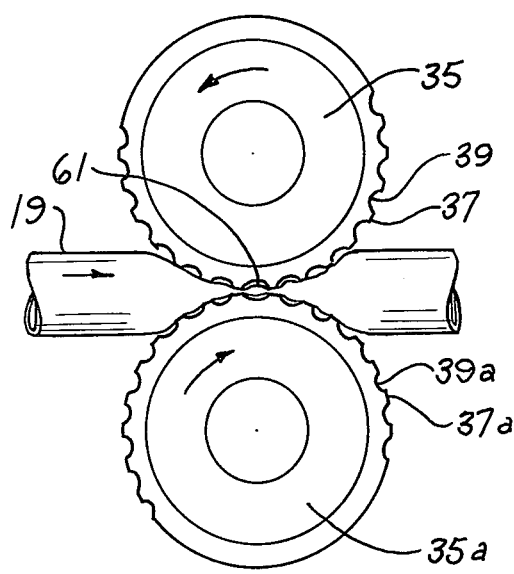
FIG. 6 is a detailed view of an alternative embodiment of apparatus according to the invention illustrating a high nip pressure operating condition.
Figure 7:
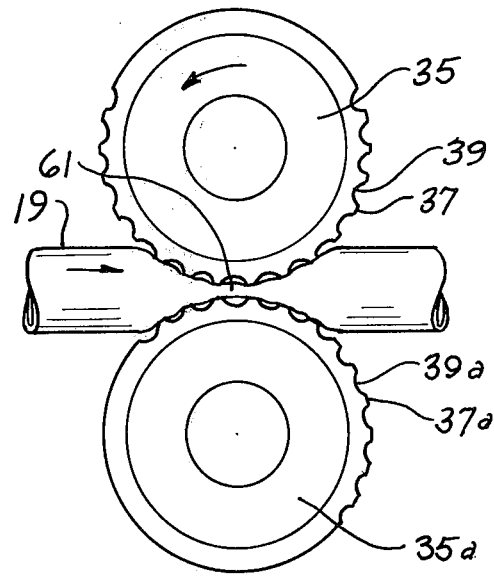
FIG. 7 shows the apparatus of FIG. 6 in a low nip pressure operating condition.

FIGS. 6 and 7 illustrate an alternative embodiment of apparatus according to the invention wherein both of the pressure regulating nip rolls are provided with lands and grooves. In FIG. 4, the smooth surfaced roll 31 is replaced by a roll 35a having a circumferential surface provided with lands 37a and grooves 39a. The rolls 35 and 35a are synchronized by any suitable conventional means to rotate cooperatively to effect precise land 37 to land 37a contact. In all other respects the operation is as described in respect of FIGS. 4 and 5, above. The accumulation chambers formed with this arrangement each have double or more the volume of the chambers formed with the apparatus arrangement of FIGS. 4 and 5. FIG. 6 shows a high nip pressure mode of operation and FIG. 7 shows a low nip pressure mode.

It is advantageous to make the surface of one of the rolls 31 35, or 35 35a, or whatever, resilient and the surface of its coacting roll hard. This permits good positive nip action and good accumulation chamber definition, and lessens the risk of cutting or marring the casing. The exact configuration and geometry of the lands and grooves, as well as roll size, can be varied to meet requirements specific to the material in process, desired pumping rates, process speed and other relevant parameters.

In a typical embodiment for collagen casing production a roll 31 is a 4 inch diameter, 3¼ inch wide aluminum cylinder surfaced on its center peripheral circumference with polyurethane film to provide resiliency, and a roll 35 is of any suitable metal, machine finished and polished, with an overall land surface diameter of slightly more than 4 inches, a width of 4-1/8 inches, 25 lands each 0.064 inch transverse to the roll width, and 26 grooves each 0.437 inch transverse to the roll width formed on a 0.338 inch radius. The materials and construction of the rolls, like the roll dimensions and geometry, can be selected according to use requirements.

Nip pressure is also a function of required operating parameters. For food casing production applications, a pressure availability of 60 to 80 psig on a 2 inch bore cylinder is sufficient. The magnitude of the pressurized nip of the pressure regulating roll assembly normally varies between 8 and 40 psig on a 2 inch bore cylinder. This variation is experienced because casing production operating conditions vary from blend to blend of casing starting material, a circumstance affecting size control.

In the foregoing description reference is made to drive means operably connected to one of the rolls of the pressure regulating roll pair. While drive means may be advantageously included or even be essential in certain applications of this invention, there are many applications where driving force need not be imparted to either of the rolls, rotational movement being imparted by the advancing casing or tubing itself which may in turn receive its advancing impetus from a drive roll arrangement, a set of metering rolls for instance, elsewhere on the process line.

It is important to note that the invention works equally well with either a high pressure inflation gas fed to the high pressure zone or a low pressure inflation gas fed to the low pressure zone of zones to be controlled. It is also possible, in pumping up, at adequate nip pressures and casing advance speeds, from a low pressure zone to a high pressure zone fed by a high pressure inflation gas source, to attain in the high pressure zone an inflation pressure higher than that of the supply source.

Figure 2:
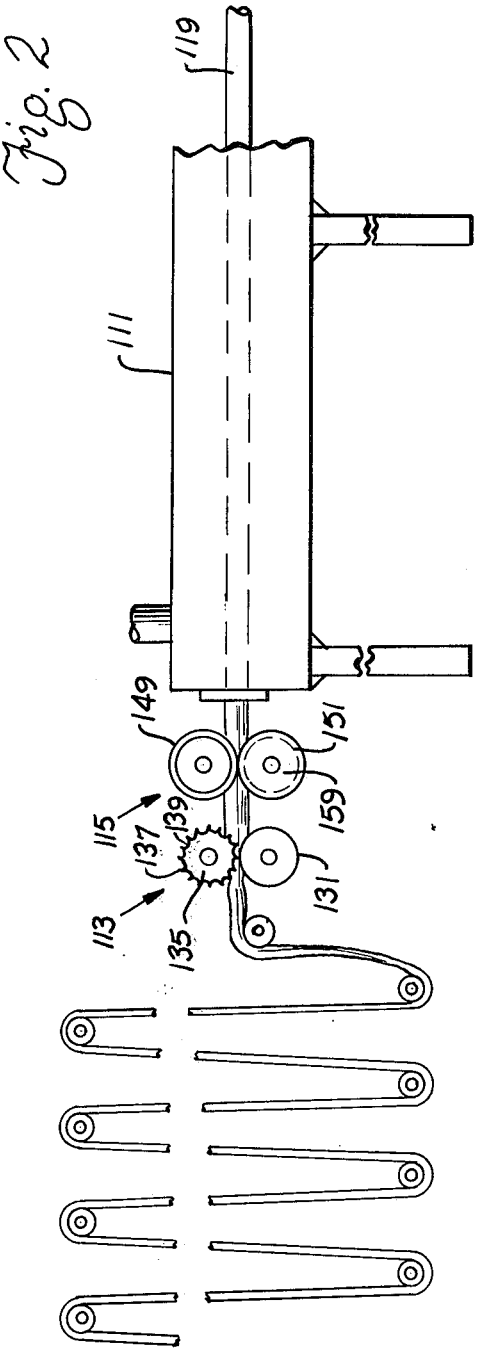

FIG. 2 of the drawings shows apparatus according to the invention installed between a low pressure wet treatment zone and a relatively higher pressure drying zone in a casing production system. Inflation gas pressure is increased for the drying step to obtain proper sizing of the casing. In the arrangement shown, a wet, slack casing or tubing 119 is pulled through a pressure regulating station 113 by a metering roll assembly 115 and advanced to the dryer 111. Inflation gas, air for instance, for such an arrangement may be supplied to the low pressure zone at or near the casing extrusion head in the case of cellulose casing production, or, in the case of collagen casing production, to the high pressure zone from a shirring mandrel tip at the end of the line.

Numerous alternative apparatus embodiments and modes of practicing the invention, but well within the spirit thereof, will undoubtedly, in the light of the disclosure, occur to persons conversant with the art. It is therefore intended that the description herein be taken as illustrative only, and not construed in any limiting sense.

What is claimed is:

1. In a system for the production of flexible film tubing which system includes means for continuously introducing an inflation gas into the interior of the tubing and means for continuously unidirectionally advancing the tubing from a first zone to a second zone, apparatus to maintain a preselected inflation gas pressure differential between the first zone and the second zone comprising, in combination:

A pair of nip rolls disposed in selectably adjustable tube flattening nipping contact on the continuously advancing tubing, at least one of the rolls of said pair having a circumferential surface provided with alternate lands and grooves extending transversely on the width of its circumferential surface, and means to continuously selectably vary the contact pressure exerted on the advancing tubing by said pair of nip rolls, whereby a continuous succession of selectably variable volume inflation gas accumulation chambers is formed, one chamber at a time, in the advancing tubing in said grooves and the successive inflation gas quantities in said accumulation chambers are passed from one of said zones to the other.

2. Apparatus according to claim 1 wherein said pair of nip rolls consists of a first roll having a smooth transversely flat circumferential surface and a second roll having a circumferential surface provided with alternate lands and grooves extending transversely on the width of its circumferential surface.

3. Apparatus according to claim 1 wherein said pair of nip rolls consists of two rolls, each having a circumferential surface provided with alternate lands and grooves extending transversely on the width of its circumferential surface.

4. Apparatus according to claim 3 in combination with synchronizing means between the two rolls arranged to effect land to land interroll contact during roll rotation.

5. Apparatus according to claim 1 in combination with rotational drive means operably connected to one of said rolls.

6. Apparatus according to claim 2 wherein the smooth transversely flat circumferential surface of said first roll is a resilient surface.

7. Apparatus according to claim 3 wherein the lands surfaces on at least one of said rolls are resilient surfaces.

8. In a system for the production of flexible film tubing which system includes means for continuously introducing an inflation gas into the interior of the tubing and means for continuously unidirectionally advancing the tubing from a first zone to a second zone, apparatus to maintain a preselected inflation gas pressure differential between the first zone and the second zone comprising, in combination:

A pair of nip rolls consisting of a first roll and second roll disposed in tube flattening nipping contact on the continuously advancing tubing, said first roll having a smooth transversely flat resilient circumferential surface, said second roll having a circumferential surface provided with alternate lands and grooves extending transversely across the width of its circumferential surface, means to continuously selectably vary the contact pressure exerted on the advancing tubing by said pair of nip rolls, and rotational drive means operably connected to one of said rolls, whereby a continuous succession of selectably variable volume inflation gas accumulation chambers is formed, one chamber at a time, in the advancing tubing in the grooves of the second roll coacting in nipping relationship with the first roll, and the successive inflation gas quantities in said accumulation chambers are passed from one of said zones to the other.

9. A method for maintaining a preselected inflation gas pressure differential in a flexible tubing continuously advancing from a first zone at a first pressure into a second zone at a second pressure, comprising the steps of:
  inflating said tubing with a supply of inflation gas to one of said zones;
  forming a continual series of accumulation chambers sequentially, one at a time, in the advancing tubing by flattening the tubing at two spacedly adjacent lines of pressurized nip contact extending transversely across the tubing to accumulate successive quantities of inflation gas in said chambers;
  regulating the volume in each of said accumulation chambers by adjustment of the nip contact pressure;
  advancing said continual series of accumulation chambers formed in the advancing tubing into the second zone; and
  simultaneously sequentially releasing the pressurized nip contact across the tubing,
  whereby inflation gas in one of said zones passes to the other of said zones through said continually formed accumulation chambers.

10. A method according to claim 9 wherein said first zone is a low pressure zone, said second zone is a high pressure zone, the tubing advances continuously from the first zone into the second zone, and the inflation gas is supplied to said second zone.

* * * * *